H. B. TURNER.
TREAD FOR TRACTOR WHEELS.
APPLICATION FILED FEB. 26, 1921.

1,395,237.

Patented Oct. 25, 1921.

Inventor:
Henry B. Turner.

Attorneys.

UNITED STATES PATENT OFFICE.

HENRY B. TURNER, OF SUISUN, CALIFORNIA.

TREAD FOR TRACTOR-WHEELS.

1,395,237.  Specification of Letters Patent.  Patented Oct. 25, 1921.

Application filed February 26, 1921. Serial No. 447,970.

*To all whom it may concern:*

Be it known that I, HENRY B. TURNER, a citizen of the United States, residing at Suisun, in the county of Solano, State of California, have invented certain new and useful Improvements in Treads for Tractor-Wheels; and I do hereby declare the following to be a full, clear, and exact description of the invention, such as will enable others skilled in the art to which it appertains to make and use the same.

This invention relates to new and useful improvements in treads and particularly to treads for use in connection with the front wheels of tractors.

The principal object of the invention is to provide a tread which will serve to prevent the central sharp rib of the front wheel from tearing the road and street surfaces of towns.

Another object is to provide an auxiliary tread for the front wheel of a tractor which can be easily and quickly secured thereon or removed therefrom, without modifications to the wheel.

Other objects and advantages will be apparent from the following description when taken in connection with the accompanying drawing.

Figure 1:
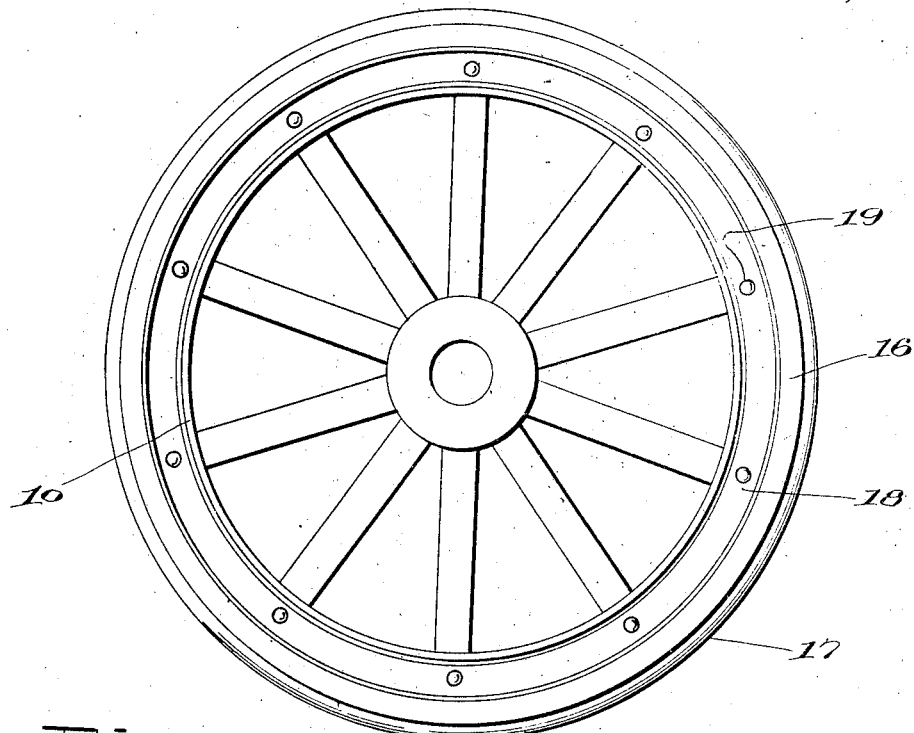
Figure 1 is a side elevation of the front wheel of a tractor showing the invention applied thereto.
Figure 2:
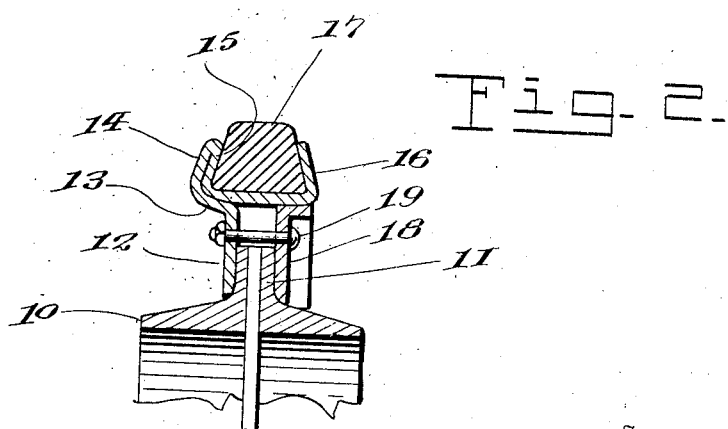
Fig. 2 is a vertical transverse sectional view through the wheel and auxiliary tread, showing the manner of securing the same to the wheel.

Referring particularly to the accompanying drawing 10 represents the rim of the front wheel of a tractor in connection with which the invention is used, said rim having the external circumferentially extending sharp rib 11 which prevents side slipping or skidding of the wheel.

When tractors come into towns or cities the ribs of the front wheels dig into the road surface or paving, with the result that considerable damage is done to the road or street. In some towns or cities there are laws prohibiting the entrance of tractors, because of the damage they do to the roads or streets. It is the particular object of this invention to provide an attachment for each of the front wheels which will prevent the ribs from contacting with the road or street surface.

The auxiliary rim member is formed from a single sheet of heavy metal bent to form the web portion 12, which lies against one side face of the rib 11 of the wheel. The sheet is further bent outwardly at 13, then away from the rim of the wheel, as at 14, where it is doubled on itself at 15, and returned inwardly and laterally across the periphery of the rib, with its marginal edge turned away from the rim of the wheel to form the flange 16. The portions 15 and 16 thus form side flanges between which the tire 17 is retained, said tire being preferably solid rubber.

Against the opposite side of the rib 11 is disposed a ring 18, and through this ring and the web 12, are disposed the clamping bolts 19, said bolts passing transversely of the outer periphery of the rib, thus obviating the necessity of forming openings through the rib.

While the device is especially designed for use on the front wheels of Fordson tractors, it may be used on any of the tractors now in use.

What is claimed is:

1. The combination with the front wheel of a tractor which has a central circumferential rib, of an auxiliary tread comprising a grooved ring removably disposed on the rim of the wheel and straddling the rib thereof, and a tire seated in the grooved ring.

2. An auxiliary tread for the front wheel of a tractor comprising a circumferentially channeled member having an inwardly directed web for disposition on the rim of a wheel and against one side of the traction rib of the wheel, a tire seated in the channel, and a removable ring bolted to the web outwardly of the periphery of the rib and disposed on the rim and against the other side of the rib.

3. An auxiliary tread for the front wheel of a tractor comprising a channeled member formed from a single piece of metal in the form of a ring and having the web for disposition on the rim of a wheel and against one side of the central rib thereof, the metal being rebent to form the side flanges of the channel, and a channeled ring for disposition against the rim and the other side of the rib, and securing means engaged through the ring and web outwardly of the rib.

In testimony whereof, I affix my signature in the presence of witnesses.

HENRY B. TURNER.

Witnesses:
BRANTLEY W. DOBBINS,
L. A. TORP,
O. L. GREENE.